May 15, 1962  F. M. ARNESEN ET AL  3,035,010
COMPOSITIONS COMPRISING GRAFT COPOLYMERS OF N-VINYL-2-OXAZOLIDINONE
MONOMERS ON ACRYLONITRILE POLYMER SUBSTRATES, ARTICLES
THEREOF, AND METHOD OF MAKING SAME
Filed Jan. 29, 1958

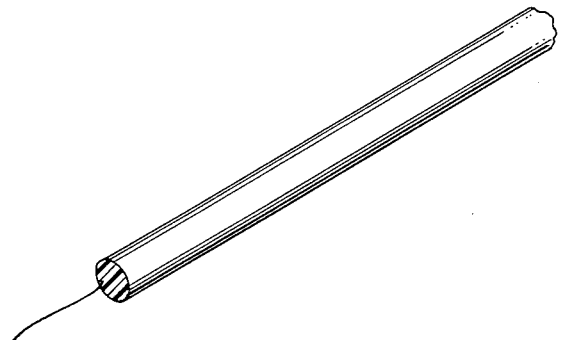

Filamentous article comprising a graft
copolymer of an N-vinyl-2-oxazolidinone
monomer on an acrylonitrile polymer sub-
strate.

INVENTORS.
Frederick M. Arnesen
Lamar C. Cloninger

BY Griswold & Burdick
ATTORNEYS

United States Patent Office 3,035,010
Patented May 15, 1962

3,035,010
COMPOSITIONS COMPRISING GRAFT COPOLYMERS OF N-VINYL-2-OXAZOLIDINONE MONOMERS ON ACRYLONITRILE POLYMER SUBSTRATES, ARTICLES THEREOF, AND METHOD OF MAKING SAME
Frederick M. Arnesen, Bay City, and Lamar C. Cloninger, Midland, Mich., assignors to The Dow Chemical Company, Midland, Mich., a corporation of Michigan
Filed Jan. 29, 1958, Ser. No. 711,945
12 Claims. (Cl. 260—45.5)

The present invention lies generally in the field of organic chemistry and contributes in particular to the art which pertains to synthetic, fiber-forming high polymers. More particularly, the present invention has reference to the provision of certain readily-dyeable graft, or block-type, copolymers that are comprised of N-vinyl-2-oxazolidinone monomers polymerized on acrylonitrile polymer substrates.

Hydrophobic polymeric materials of varying origin are commonly employed in the manufacture of various synthetic shaped articles including films, ribbon, fibers, filaments, yarns, thread and the like and related structures, which hereinafter will be illustrated with particular reference to fibers. Polymers and copolymers of acrylonitrile which contain in the polymer molecule at least about 80 percent by weight of combined acrylonitrile units may be utilized with great advantage for such purposes. Difficulty is often encountered, however, in suitably dyeing synthetic hydrophobic fibers and the like that have been prepared from acrylonitrile polymers, especially those that are comprised essentially of polyacrylonitrile. This is especially so when it is attempted to obtain relatively deeper shades of coloration in the finally dyed product.

Various techniques have been evolved for providing acrylonitrile polymer compositions of improved dyeability. These include copolymerizing acrylonitrile with various monomeric materials which are intended to lend an enhanced dye-receptivity to the copolymeric product; blending polyacrylonitrile or other acrylonitrile polymers with one or more dye-receptive polymeric materials prior to formation of a fiber product or to the shaped article; and impregnating an already-formed acrylonitrile polymer fiber or other shaped article with a dye-assisting adjuvant or dye-receptive agent, which frequently may be a polymeric material.

The practice of such techniques has not always been completely satisfactory. Neither have the products achieved thereby always provided a completely suitable solution to the problems involved. For example, many of the fiber products which are prepared in accordance with the above-identified techniques known to the art often have inferior physical properties when they are compared with those prepared from unmodified acrylonitrile polymers, particularly polyacrylonitrile. Also, such products, once they have been prepared, may not be as receptive as might be desired to a wide range of dyestuffs, due to inherent limitations in the materials capable of being employed for enhancing dye-receptivity. In addition, especially when textile fiber products are involved, treatment or modification of the acrylonitrile polymer article in any of the indicated known ways may not always permit uniform penetration of the dye throughout the cross-section of the fiber. Frequently, the articles which have in their peripheral portions. When this phenomenon occurs (which, in connection with fiber products, is ordinarily referred to as ring-dyeing), fibrillation of the fiber, such as normally results from its use, exposes the uncolored interior portions. Such behavior, of course, is undesirbeen modified according to known procedures may exhibit an undesirable tendency to accept a dyestuff only able and objectionable in fabrics and other textile materials constructed with fibers of the acrylonitrile polymers.

It would be advantageous, and it is the chief aim and concern of the present invention, to provide acrylonitrile polymers which have been modified with certain graft or block copolymerized substituents so as to be exceptionally dye-receptive while being capable of being fabricated into fibers and the like and related shaped articles having excellent physical properties and other desirable characteristics commensurate with those obtained with the unmodified acrylonitrile polymer substrates, and of the general order obtainable with unmodified polyacrylonitrile. This would possibilitate the manufacture of acrylonitrile polymer based fibers and the like articles having the highly desirable combination of attractive physical characteristics and substantial capacity for and acceptance to dyestuffs.

To the attainment of these and related ends, a dye-receptive polymer composition that is adapted to provide shaped articles having excellent physical properties and characteristics while being simultaneously receptive of and dyeable to deep and level shades of coloration with many of a wide variety of dyestuffs is, according to the present invention, comprised of a fiber-forming graft or block copolymer which is comprised or consists essentially of an acrylonitrile polymer substrate having a minor proportion of substituents graft copolymerized thereto consisting essentially of one or more polymerized N-vinyl-2-oxazolidinone monomers. Schematically, the compositions may be structurally represented in the following manner:

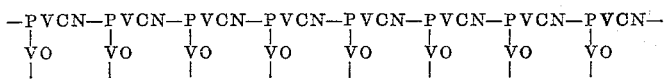

wherein the interlinked "PVCN" symbols represent the acrylonitrile polymer substrate or trunk and the symbols "VO" connected thereto the substituent graft copolymer branches of the indicated N-vinyl-2-oxazolidinone monomer provided thereon.

As is apparent, the graft copolymer substituent that is combined with the acrylonitrile polymer substrate lends the desired receptivity of and substantivity for various dyestuffs to the compositions while the acrylonitrile polymer trunk substrate that is so modified facilitates and secures the excellent physical properties and characteristics of the various shaped articles, including fibers into which the compositions may be fabricated. Advantageously, as mentioned, the acrylonitrile polymer substrate that is modified by graft copolymerization to provide the compositions of the invention contains in the polymer molecule at least about 80 percent by weight of combined acrylonitrile. More advantageously, the acrylonitrile polymer substrate consists substantially or entirely of polyacrylonitrile.

It is usually beneficial, as has been indicated, for the graft copolymer compositions of the present invention to contain a major proportion of the acrylonitrile polymer trunk or substrate that has been modified with the substituent dye-receptive graft copolymer groups chemically attached thereto. As a general rule, for example, it is desirable for the graft copolymer to be comprised of at least about 80 percent by weight of the acrylonitrile polymer substrate. In many instances, it may be satisfactory for the graft copolymer composition to be comprised of between about 85 and 95 percent by weight of the acrylonitrile polymer substrate, particularly when it is polyacrylonitrile. In this connection, however, better dyeability may generally be achieved when the grafted N-vinyl-2-oxazolidinone polymer substituents are prepared under such conditions that they have relatively long chain lengths. Thus, it is usually preferable, when identical quantities of grafted substituents are involved, for relatively fewer, but longer chain length grafts to be available than to have a greater number of substituents of relatively shorter chain length.

The N-vinyl-2-oxazolidinone monomers which are utilized to modify the acrylonitrile polymer substrates so as to provide the graft copolymer compositions of the present invention may be any of those (or their mixtures) which are of the generic structure:

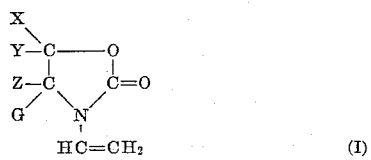

$$\text{(I)}$$

in which each of the substituents X, Y, Z and G are independently either hydrogen or other substituent groups, particularly alkyl substituents containing from 1 to about 4 carbon atoms and aryl substituents containing from about 6 to about 10 carbon atoms. Unsubstituted N-vinyl-2-oxazolidinone, which is described in United States Letters Patent No. 2,818,362 and is of the precise structure:

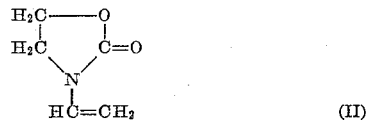

$$\text{(II)}$$

may be utilized with great advantage. Ring substituted N-vinyl-2-oxazolidinone monomers can also be employed with considerable benefit, particularly such monomers as N-vinyl-5-methyl-2-oxazolidinone and N-vinyl-5-ethyl-2-oxazolidinone. Other ring substituted N-vinyl-2-oxazolidinone monomers that may be used include N-vinyl-2,5-dimethyl - 2 - oxazolidinone; N - vinyl - 5 - phenyl - 2-oxazolidinone and the like.

As mentioned, the graft copolymer compositions of the invention have remarkably good dye-receptivity, particularly in view of their acrylonitrile polymer origin. In most cases, for example, the dye-receptivity of the graft copolymer of the present invention is improved to such an extent in comparison with the unmodified acrylonitrile polymers, particularly unmodified polyacrylonitrile, that a color differential of at least about 40 Judd units, as is hereinafter apparent, may readily be obtained between samples of the unmodified acrylonitrile polymer substrate and the graft copolymer compositions of the present invention, each of which have ben dyed at a 4 percent dyeing according to conventional techniques, with such a dyestuff as Calcodur Pink 2BL. This is a significant advantage when the compositions are fabricated into shaped article form, especially when they are prepared in a filamentary form that is suitable for use as a textile material.

The Judd Unit is described by D. B. Judd in the "American Journal of Psychology," vol. 53, page 418 (1939). More applicable data appears in "Summary on Available Information on Small Color Difference Formulas," by Dorothy Nickerson, in the "American Dyestuff Reporter," vol. 33, page 252, June 5, 1944. Also see "Interrelation of Color Specifications," by Nickerson, in "The Paper Trade Journal," vol. 125, page 153, for November 6, 1947.

As is well known, Calcodur Pink 2BL is a direct type of dye that has a Colour Index 353. It is commercially obtainable under the indicated trade-designation. The same dyestuff, which is the sodium salt of 3,3'-disulphodiphenylurea - 4,4' - diazobis - 2 - amino - 8 - naphthol - 6-sulfonic acid, is actually available (frequently under other commercial designations) from several sources. The structure of Calcodur Pink 2BL is given at page 88, Section A, Part IV, of the "Colour Index" (1st ed., 1924) published by the (British) Society of Dyers and Colourists. More recently, this dyestuff has been designated Colour Index Direct Red 75.

Besides having excellent physical properties and other desirable characteristics, fibers and the like articles comprised of the present compositions similarly have the indicated high capacity for being readily and satisfactorily dyed to deep and level shades of coloration with many dyestuffs. For example, fibers of the present compositions may be easily and successfully dyed according to conventional procedures using acid, vat, acetate, direct, naphthol, and sulfur dyes. Such dyestuffs, in addition to the particular variety mentioned, by way of didactic illustration as Calcocid Alizarine Violet (Colour Index 61710, formerly Colour Index 1080), Sulfanthrene Red 3B (Colour Index Vat Violet 2), Amacel Scarlet BS (American Prototype Number 244 and Colour Index Dispersed Red 1 or 11110), Naphthol ASMX (Colour Index 35527) and Fast Red TRN Salt (Colour Index Azoic Diazo Component 11), and Ommedial Bordeaux G (Colour Index Sulfur Brown 12) may advantageously be employed for such purposes.

Other dyestuffs, by way of further illustration, that may be utilized beneficially on fiber products of the dye-receptive graft copolymer compositions of the invention include such direct cotton dyes as Chlorantine Fast Green 5GLL (Colour Index Direct Green 27), Chlorantine Fast Red 7B (Colour Index Direct Red 81), Pontamine Green GX Conc. 125 percent (Colour Index Direct Green 6), Calcimine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2B (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59, Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green I) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. Paste (Colour Index Vat Blue 5), and Sulfanthrene Red 3B Paste (Colour Index Vat Violet 2); Indigosol Green IB Powder (Colour Index Vat Green 1), a soluble vat dyestuff; such acetate dyes as Celliton Fast Brown 3RA Extra GF (Colour Index Dispersed Orange 5), Celliton Fast Rubine BA CF (Colour Index Dispersed Red 13), Artisil Direct Red 3BF and Celanthrene Red 3RB Conc. (Both Colour Index Dispersed Red 15), Celanthrene Pure Blue BRS 400 percent (Colour Index Dispersed Blue 1) and Acetamine Yellow N (Coolur Index Dispersed Yellow 32; B-Naphthol←2-chloro-4-nitroaniline, an azoic dye; such sulfur dyes as Katigen Brilliant Blue GGS High Conc. (Colour Index Sulf. Blue 9) and Indo Carbon CLFS (Colour Index Sulf. Blue 6); and premetallized dyestuffs including Cibalan Yellow GRL (Colour Index Acid Yellow 116); and the like.

The dyed products, especially textile fiber products, are generally lightfast and are well imbued with good resistance to crocking. In addition, dyed textile fiber products comprised of the compositions of the invention exhibit remarkable washfastness, despite repeated exposure and subjection to washing, laundering and dry cleaning treatments. A shaped filamentary article prepared from a dye-receptive composition in accordance with the present invention is schematically illustrated in the sole FIGURE of the hereto annexed drawing.

The dye-receptive graft copolymers of the present invention may be prepared and provided by impregnating the acrylonitrile polymer substrate with the monomeric substance, then polymerizing the monomer in situ in the acrylonitrile polymer substrate. Advantageously, this may be accomplished when the substrate is in the form of an already shaped article, such as a fiber or filamentary structure. Beneficially, the graft copolymerization of the impregnated monomer may be accomplished and facilitated with the assistance of a polymerization catalyst or catalyzing influence which preferentially interacts with the substrate in order to establish or form grafting sites thereon and simultaneously or subsequently initiate the graft copolymerization. As a practical matter, it is generally most desirable to form the graft copolymer compositions in such matter. Most of the free radical generating chemical catalysts, including peroxide and persulfate catalysts, may be utilized for the desired graft copolymerization. It may often be exceptionally advantageous, however, to accomplish the graft copolymerization by subjecting the N-vinyl-2-oxazolidinone monomer-impregnated acrylonitrile polymer substrate to a field of high energy radiation in order to efficiently provide an effectively attached graft copolymer of the polymerized monomeric impregnant on the hydrophobic acrylonitrile polymer substrate. Thus, the graft copolymer compositions of the present invention may advantageously be provided in accordance with the general procedure that is described in copending application for United States Letters Patent of George W. Stanton and Teddy G. Traylor having Serial No. 553,701, filed December 19, 1955, disclosing a "Process for Treating Shaped Polymeric Articles to Improve Dyeability," using the presently contemplated N-vinyl-2-oxazolidinone monomers in the procedure.

The N-vinyl-2-oxazolidinone monomer may be intimately impregnated in the acrylonitrile polymer substrate in any desired manner prior to the graft copolymerization. Thus, the monomer may be directly applied or it may be applied from dispersion or solution in suitable liquid vehicles until a desired monomer content has ben obtained. Ordinarily, it is advantageous for the monomer to be diluted in a solvent or dispersant vehicle so as to provide a treating bath in which to impregnate the acrylonitrile polymer substrate with the latter being immersed in the bath for a sufficient period of time to attain a desired monomer content adequate for the intended purpose. The acrylonitrile polymer substrate, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the acrylonitrile polymer (or a cloth or fabric comprised thereof) with the N-vinyl-2-oxazolidinone monomer in order to prepare the graft copolymer compositions of the invention.

In this connection, particularly when preformed fiber structures are involved, the article may be in any desired state of formation for the impregnating and graft copolymerizing modification. Thus, fibers and films may be treated before or after any stretch has been imparted thereto. In addition, they may be in various stages of orientation, or in a gel, swollen or dried condition. It is generally advantageous to prepare the compositions of the present invention by impregnating the monomer into the acrylonitrile polymer substrate while the latter is in a water-swollen or hydrated aquagel condition, prior to being finally converted to a dried polymer structure. Such aquagels may be obtained by forming the shaped acrylonitrile polymer articles from the acrylonitrile polymer while it is dissolved in an aqueous saline solution thereof (such as a 60 percent by weight aqueous zinc chloride solution) as by coagulation in a suitable aqueous liquid bath capable of having such effect. When impregnating baths of the monomer are employed, it is generally desirable for them to have a monomer concentration of between about 0.5 and 50 percent by weight and to be prepared as an aqueous solution of the monomer. This is particularly the case when the acrylonitrile polymers in an aquagel condition are being impregnated. The impregnation of acrylonitrile polymer fibers and related shaped articles from such a bath may be continued until between about 0.5 and 20 or so percent by weight of the N-vinyl-2-oxazolidinone monomer, based on the weight of the acrylonitrile polymer substrate, is incorporated in the substrate. Obviously, unfabricated polymers may be impregnated in an analogous manner. Ordinarily, an impregnating bath having a monomer concentration of between about 5 and 15 percent by weight may advantageously be employed to impregnate the acrylonitrile polymer substrate with the N-vinyl-2-oxazolidinone monomer to an amount or extnet between about 5 and 15 percent by weight of the polymer substrate.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20 and 60° C. utilizing relatively low dose rates and total dosages of the high energy for the desired purpose.

When the graft copolymer compositions are prepared from preformed or already shaped acrylonitrile polymer substrates that are successively impregnated with the N-vinyl-2-oxazolidinone monomer, which is then graft copolymerized in situ in the shaped article, excess monomer, if desired, may be squeezed out or removed in any suitable manner prior to effecting the graft copolymerization.

The chemical free radical generating catalysts which may be employed with greatest advantage in the preparation of the graft copolymer compositions of the present invention include hydrogen peroxide, benzoyl peroxide, cumene hydroperoxide, ammonium or potassium persulfates, etc. Such catalysts may be used in conventional quantities to effect the graft copolymerization. When they are utilized, it is of greatest benefit to incorporate them in the impregnating solution of the N-vinyl-2-oxazolidinone monomer that is used.

The high energy radiation which may be employed for inducing the graft copolymerization for the preparation of the graft copolymers of the present invention is of the type which provides emitted particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reactor fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric N-vinyl-2-oxazolidinone impregnant to, upon and with the acrylonitrile polymer substrate being modified in order to provide the compositions of the present invention.

For purposes of specifically illustrating, without intending to thereby limit the invention, the following didactic examples are provided wherein, unless otherwise indicated, all parts and percentages are to be taken by weight.

*Example 1*

A sample of a salt-spun, wet-stretched acrylonitrile polymer in aquagel form was wound into skeins and soaked for about 10 minutes at room temperature in a 10 percent aqueous solution of N-vinyl-5-methyl-2-oxazolidinone using a 30:1 bath factor, based on the weight of the goods being impregnated.

The polyacrylonitrile aquagel fiber, which contained about 2 parts by weight of water in the gel phase to each part by weight of dry polymer therein, had been obtained by extruding a spinning solution comprised of about 10 parts of polyacrylonitrile dissolved in about 90 parts of a 60 percent aqueous solution of zinc chloride into an aqueous coagulating bath that contained about 42 percent of zinc chloride dissolved therein. A multiple filament tow was prepared in the spinning operation by extruding the spinning solution through a multiple orifice spinnerette in which each of the dye or jet holes had a diameter of about 6 mils. The coagulated tow bundle, which had a total denier in the neighborhood of 500, was washed substantially free from salt after having been withdrawn from the coagulating bath. Prior to being impregnated with the monomeric N-vinyl-5-methyl-2-oxazolidinone solution, the aquagel fiber was wet-stretched for purposes of orientation to a total stretched length that was about 12 times is original extruded length.

After the impregnation, the skein of monomer-containing aquagel fiber was freed of excess monomer solution by letting it drip-dry for about 15 seconds subsequent to having been placed in a test tube. The test tube was then sealed and the sample therein contained was exposed to high energy raidiation from a cobalt-60 source until a dosage of about 4 mrads. of high energy had been achieved. After irradiation, the sample was scoured using about 0.5 percent, on the weight of the fiber, of detergent in an aqueous solution at 160° F. for 15 minutes. The resulting graft copolymer fiber product was found to have experienced a substantial increase in weight over the unmodified starting material due to the substituent units of graft copolymerized N-vinyl-5-methyl-2-oxazolidinone attached thereon.

The irradiated graft copolymer fiber sample was then dyed with 2 percent of well dissolved Wool Fast Blue BLA, an acid dyestuff (C.I. 833), according to a conventional procedure using a dye bath containing about 20 percent Glauber's salt (sodium sulfate) and 5 percent acetic acid (28 percent strength), in which the weight ratio of bath-to-fiber was about 30:1. The sample was placed in the dye bath at 100° F. after which the temperature was gradually raised to 195–200° F. and maintained at the higher level for about 45 minutes. After being dyed, the sample was rinsed well with warm water and scoured with 0.5 percent aqueous detergent solution for 15 minutes prior to being dried for about 20 minutes at 175° F. The graft copolymer fiber sample was found to have become dyed to a deep and level shade of blue coloration. In contrast, ordinary unmodified polyacrylonitrile yarn is merely stained to an exceedingly pale blue shade in the same dyeing operation.

*Example 2*

The foregoing procedure was repeated excepting to conduct the impregnation of the aquagel fiber at a temperature of 80–90° C. Identical excellent results were achieved.

*Example 3*

The procedures of the first two examples were duplicated excepting to utilize N-vinyl-2-oxazolidinone as the impregnating monomer. Substantially identical results were obtained.

When the procedures of the first three examples were repeated excepting to employ hexamethylene diamine-adipic acid superpolyamide and ethylene glycol terephthalate polyester fiber substrates (nylon 6–6 and "Dacron," respectively) in place of the acrylonitrile polymer fiber, no equivalent graft copolymer products were formed.

*Example 4*

The procedures of the first three examples are duplicated excepting to utilize (for the high energy field) the irradiation in high energy electron beam from Van de Graaff generator operated at 2 million volts and one microampere beam current at a dose rate of about 25,000 rep. per minute until a weight pick up of the graft copolymerized substituents of about 10 percent is achieved.

When the thereby obtained irradiated graft copolymer fibers are dyed with 4 percent Calcodur Pink 2BL for about one hour at the boil in a sodium sulfate containing bath according to conventional procedure, excellent dyeings are obtained. In such dyeings, the dyestuff is present in the bath in an amount equal to about 4 percent of the weight of the fiber; the sodium sulfate in an amount equal to about 15 percent by weight of the fiber and the weight ratio of bath-to-fiber is about 30:1. Numerical reflectance values generally lower than 20–25 are obtained upon the Calcodur Pink 2BL-dyed graft copolymer fibers. Such reflectance values, which may be employed to indicate relative dye receptivity, are spectro-photometrically evaluated by measuring the monochromatic light having a wave length of 520 millimicrons from a standard source that is reflected from the sample under test. The reflectance value, taken along a numerical scale from 0 to 100, represents the relative comparison of the amount of light that is reflected from the dyed sample with that which is reflected from a standard white tile reflector having an arbitrarily assigned reflectance value according to the numerical scale used of about 316. As is well known in the art, lower reflectance values are an indication of better dye receptivity in a given fiber sample. For example, a reflectance value of about 20–25 for acrylonitrile polymer synthetic fibers dyed with 4 percent Calcodur Pink 2BL is generally considered by those skilled in the art to represent a degree of dye-receptivity that readily meets or exceeds the most rigorous practical requirements and is ordinarily assured of receiving general commercial acceptance and approval. Unmodified polyacrylonitrile fibers usually have a reflectance value of at least about 100. Reflectance values that are lower than 20–25 are generally indicative of a color yield improvement of at least about 40 Judd units, as representative by the differential between the samples in dyed and undyed condition.

*Example 5*

When the foregoing procedures are duplicated excepting to continue the irradiation until only about a 5 percent pick-up of the graft copolymerized substituents of each of the monomers is attained, substantially identical results are achieved in the graft copolymer products. In addition to the dyestuffs mentioned, the products are found to have excellent dye-ability with such dyes as Xylene Milling Black 2B, Amacel Scarlet BS, Calcocid Alizarine Scarlet, and Sevron Brilliant Red 4G, a basic dyestuff (Colour Index Basic Red 14—formerly known as Basic Red 4G). The resulting dyed graft copolymer fiber products have excellent washfastness without displaying tendencies towards ring-dyeing.

Excellent results, commensurate with those demonstrated in the foregoing, may also be employed when the above described and the equivalent procedures mentioned in the foregoing are duplicated with any other of the N-vinyl-2-oxazolidinone monomers or mixtures thereof that have been indicated as being within the scope of the invention and when the graft copolymer compositions are prepared by means of chemical catalysis or with and upon other than polyacrylonitrile substrates, including any of the acrylonitrile copolymers known to the art, which have also been indicated as being within the scope of the invention.

What is claimed is:

1. Dye-receptive graft copolymer composition consisting of (1) an acrylonitrile polymer which is a polymer of polymerizable, acrylonitrile-containing, ethylenically unsaturated monomeric material that has in the polymer molecule at least about 80 weight percent of polymerized acrylonitrile, said acrylonitrile polymer having chemically attached to carbon atoms in its chain, as graft copolymerized substituents thereon, a minor proportion of up to about 20 weight percent, based on composition weight, of units of (2) a polymerized N-vinyl-2-oxazolidinone monomer of the formula:

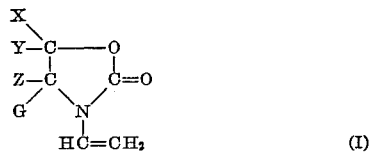

(I)

wherein X, Y, Z and G are each independently selected from the group consisting of hydrogen, alkyl radicals that contain from 1 to about 4 carbon atoms, and aryl radicals that contain from about 6 to 10 carbon atoms.

2. The composition of claim 1, wherein said acrylonitrile polymer has between about 5 and 15 percent by weight, based on the weight of the composition, of said substituent graft copolymerized units attached thereto.

3. The composition of claim 1, wherein said acrylonitrile polymer is polyacrylonitrile.

4. The composition of claim 1, wherein said substituent graft copolymer units are comprised of polymerized N-vinyl-2-oxazolidinone.

5. The composition of claim 1, wherein said substituent graft copolymer units are comprised of polymerized N-vinyl-5-methyl-2-oxazolidinone.

6. The composition of claim 1, wherein said substituent graft copolymer units are comprised of polymerized N-vinyl-5-ethyl-2-oxazolidinone.

7. The composition of claim 1, wherein said acrylonitrile polymer is polyacrylonitrile and wherein said substituent graft copolymerized units are present in an amount up to about 20 percent by weight, based on the weight of the composition, and are comprised of polymerized N-vinyl-2-oxazolidinone.

8. A filamentary shaped article comprised of the composition set forth in claim 7.

9. The composition of claim 1, wherein said acrylonitrile polymer substrate is polyacrylonitrile and wherein said substituent graft copolymerized units are present in an amount up to about 20 percent by weight, based on the weight of the composition, and are comprised of polymerized N-vinyl-5-methyl-2-oxazolidinone.

10. A filamentary shaped article comprised of the composition set forth in claim 9.

11. A filamentary shaped article comprised of the composition set forth in claim 1.

12. Method for the preparation of a dye-receptive graft copolymer which comprises polymerizing at a temperature between about 0° C. and about 200° C. a mixture in intimate contact of (1) a minor proportion, based on weight of mixture, of an N-vinyl-2-oxazolidinone monomer of the formula:

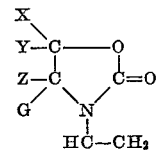

wherein X, Y, Z and G are each independently selected from the group consisting of hydrogen, alkyl radicals that contain from 1 to about 4 carbon atoms and aryl radicals that contain from about 6 to 10 carbon atoms and (2) a major proportion, based on weight of mixture, of an acrylonitrile polymer which is a polymer of polymerizable, acrylonitrile-containing, ethylenically unsaturated monomeric material that has in the polymer molecule at least about 80 weight percent of polymerized acrylonitrile.

References Cited in the file of this patent
UNITED STATES PATENTS 2,818,362    Drechsel _____ Dec. 31, 1957

UNITED STATES PATENT OFFICE
CERTIFICATE OF CORRECTION

Patent No. 3,035,010

May 15, 1962

Frederick M. Arnesen et al.

It is hereby certified that error appears in the above numbered patent requiring correction and that the said Letters Patent should read as corrected below.

Column 2, lines 6 and 7, strike out "been modified accordin to known procedures may exhibit an undesirable tendency to accept a dyestuff only" and insert the same after "have", in line 72, column 1; column 3, line 27, strike out "in", second occurrence; column 7, line 48, for "is" read -- its --; line 54, for "raidiation" read -- radiation --; same line 54, after "a", second occurrence, insert -- total --; column 10, lines 31 to 37, the formula should appear as shown below instead of as in the patent:

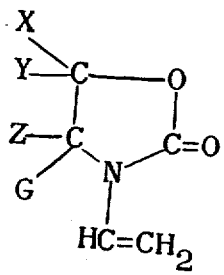

Signed and sealed this 27th day of November 1962.

(SEAL)
Attest:
ERNEST W. SWIDER ESTON G. JOHNSON
Attesting Officer

DAVID L. LADD
Commissioner of Patents